United States Patent
Kim et al.

(10) Patent No.: US 7,324,727 B2
(45) Date of Patent: Jan. 29, 2008

(54) PLANAR LIGHTWAVE CIRCUIT HAVING OPTICAL FILTER

(75) Inventors: Kyoung-Youm Kim, Seoul (KR); Jeong-Hwan Song, Seoul (KR); Se-Yoon Kim, Yongin-si (KR)

(73) Assignee: Samsung Electronics Co., Ltd., Maetan-Dong, Yeongtong-Gu Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/280,059

(22) Filed: Nov. 16, 2005

(65) Prior Publication Data
US 2006/0104571 A1 May 18, 2006

(30) Foreign Application Priority Data
Nov. 16, 2004 (KR) .................. 10-2004-0093493

(51) Int. Cl.
*G02B 6/26* (2006.01)
*G02B 6/10* (2006.01)
(52) U.S. Cl. .................... 385/43; 385/39; 385/129; 385/130
(58) Field of Classification Search ............ 385/39, 385/43, 129, 130
See application file for complete search history.

(56) References Cited

U.S. PATENT DOCUMENTS

| | | | |
|---|---|---|---|
| 5,799,120 A * | 8/1998 | Kurata et al. ................. 385/45 |
| 5,858,051 A * | 1/1999 | Komiyama et al. ........... 65/386 |
| 6,047,098 A * | 4/2000 | Sagawa et al. ............. 385/141 |
| 6,236,774 B1 * | 5/2001 | Lackritz et al. ............... 385/14 |
| 6,243,516 B1 * | 6/2001 | Seino ......................... 385/47 |
| 6,434,318 B1 * | 8/2002 | Bischel et al. .............. 385/140 |
| 6,579,398 B1 * | 6/2003 | Ogawa ....................... 156/230 |
| 7,039,289 B1 * | 5/2006 | Mendoza et al. ........... 385/132 |
| 7,065,269 B2 * | 6/2006 | Higuchi et al. ................ 385/24 |
| 7,103,252 B2 * | 9/2006 | Ide .............................. 385/131 |
| 2004/0228573 A1 * | 11/2004 | Terakawa et al. ............. 385/24 |
| 2006/0165373 A1 * | 7/2006 | Blauvelt et al. ............ 385/147 |

* cited by examiner

*Primary Examiner*—Frank G. Font
*Assistant Examiner*—Michael P. Mooney
(74) *Attorney, Agent, or Firm*—Cha & Reiter, LLC

(57) ABSTRACT

A planar lightwave circuit having an optical filter, which comprises: a first waveguide; a second waveguide separated from the first waveguide, in which the width of a first cross-section opposite to the first waveguide is wider than that of a second cross-section of the other side; and a trench located between the first and second waveguides, in which the optical filter is positioned.

12 Claims, 3 Drawing Sheets

PLANAR LIGHTWAVE CIRCUIT HAVING OPTICAL FILTER

CLAIM OF PRIORITY

This application claims priority to an application entitled "Planar Lightwave Circuit Having Optical Filter," filed in the Korean Intellectual Property Office on Nov. 16, 2004 and assigned Serial No. 2004-93493, the contents of which are hereby incorporated by reference.

BACKGROUND OF THE INVENTION

1. Field of the Invention

The present invention relates to a planar light wave circuit, and more particularly to a planar lightwave circuit having an optical filter.

2. Description of the Related Art

Recently, communication networks of FTTH (Fiber-To-The-Home) types and FTTx (x: Premises, Home, Business, etc.) in which a central base station is linked to subscribers through optical fibers are used. The optical communication method for these FTTH or the FTTx networks require various types of optical transmitting and receiving devices for performing bi-directional communications.

The optical transmitting and receiving devices used for bi-directional communications typically include detecting data after converting optical signals of the corresponding waves to electrical signals and then transmitting the data to the receiving side after the conversion of electrical data into optical signals. An integrated planar lightwave circuit is mainly used as the optical transmitting and receiving device. More specifically, planar lightwave circuits having wave division multiplexing or demultiplexing filters mounted thereto are being used. Recently, planar lightwave circuits equipped with optical filters having various functions have been deployed for various applications in the optical communication network.

FIG. 1 shows a planar lightwave circuit having an optical filter. Referring to FIG. 1, the planar lightwave device 100 comprises first and second waveguides 111 and 112 separated from each other, a trench 120 which separates the first waveguide 111 from the second waveguide 112 by a predetermined distance, and an optical filter 130 positioned in the trench 120. The planar lightwave circuit 100 forms the first and second waveguides 111 and 112 using a lower clad, a core, and an upper clad that are sequentially stacked on the semiconductor substrate.

The trench 120 is formed by dicing the lower clad, the core, and the upper clad, and as a result, it separates the first waveguide 111 from the second waveguide 112 by a predetermined distance. The optical filter 130 is positioned in the trench 120 and between the first and second waveguides 111 and 112, and a wave division demultiplexing filter for demultiplexing the inputted optical signals is used. However, since the waveguides are separated from each other by the trench, the proceeding optical signals are diffused in the trench and as a result, some of the signals fail to converge toward the other side waveguide, thereby causing insertion losses of the optical signals.

To address the above problem, a planar lightwave circuit using a multi-mode waveguide has been suggested as a means for restraining the generation of insertion losses. However, the multimode waveguide does not provide a sufficient coupling efficiency suitable for a real product.

SUMMARY OF THE INVENTION

Accordingly, the present invention has been made to solve the above-mentioned problems occurring in the prior art and provides additional advantages, by providing a planar lightwave circuit for restraining the loss generated by mounting an optical filter.

In one embodiment, there is provided a planar lightwave circuit having an optical filter, which includes: a first waveguide; a second waveguide separated from the first waveguide, in which the width of a first cross-section opposite to the first waveguide is narrower than that of a second cross-section of the other side; and a trench located between the first and second waveguides, in which the optical filter is positioned.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
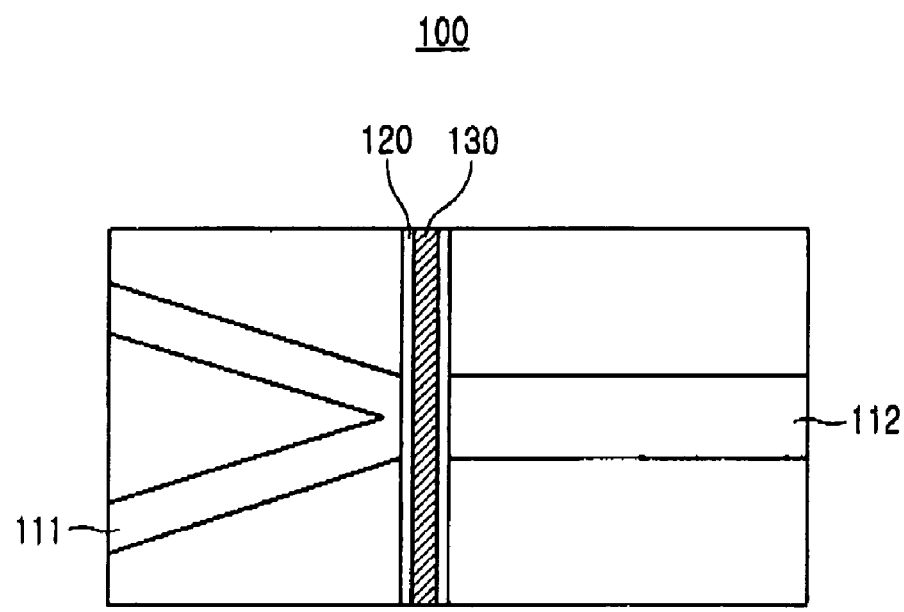
FIG. 1 illustrates a planar lightwave circuit having a conventional optical filter.
Figure 2:
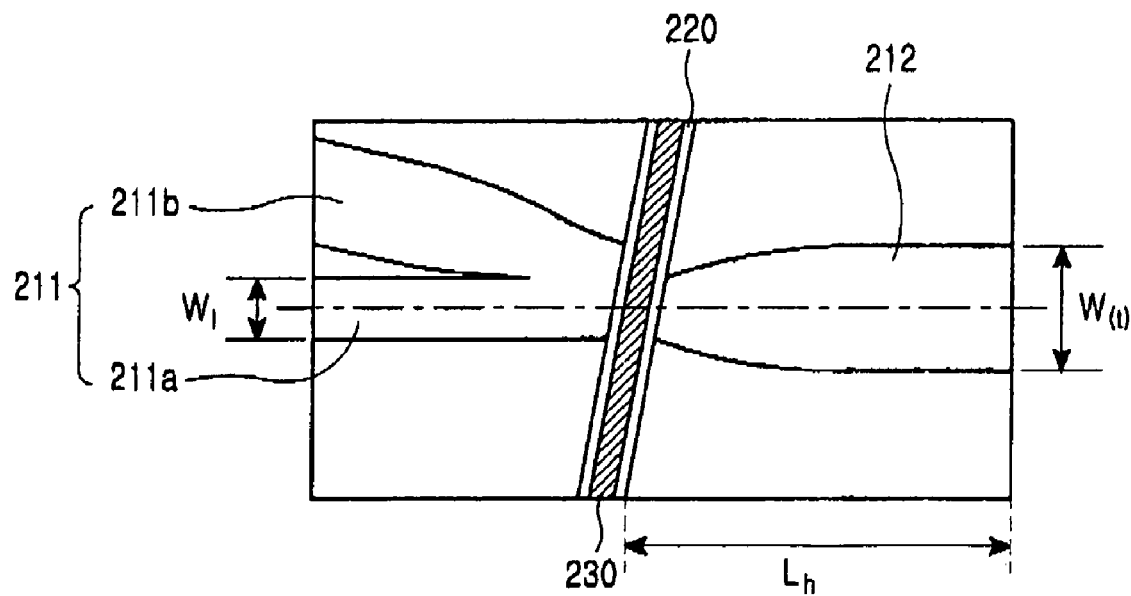
FIG. 2 illustrates a planar lightwave circuit according to an embodiment of the present invention.

Referring to FIG. 2, a planar lightwave circuit 200 according to the present invention includes first and second waveguides 211 and 212, a trench 220 which separates the first waveguide from the second waveguide, and an optical filter 230 positioned in the trench 220.

Figure 3:
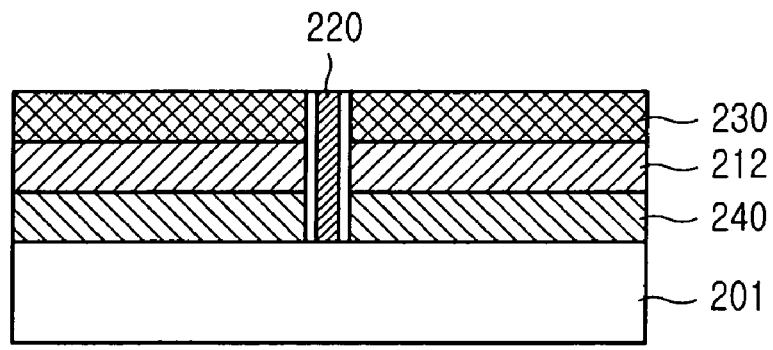
FIG. 3 is a view for showing the planar lightwave circuit shown in FIG. 2.

Referring to FIG. 3, the planar lightwave circuit 200 includes a substrate 201, a lower clad 240, a core(210), and an upper clad(250) sequentially stacked on the substrate 201. The first wave guide 211 is a single mode waveguide and includes a linear transmission waveguide 221a and a reflection waveguide 211b. The reflection waveguide 211b is identical to the second waveguide 212. The transmission waveguide 211a is a single mode waveguide and outputs the inputted optical signals to the optical filter. The reflection waveguide 211b has a shape of a parabolic horn or polynomial curve and transfers the light reflected in the optical filter 230.

The trench 220 is formed by dicing portions of the lower clad 240, core(210), and an upper clad(250), and serves to separate the second waveguide 212 from the first waveguide 211.

The trench is inclined by a predetermined angle a with respect to an optical axis and determined according to the relation between the optical filter 230 and the first and second waveguides 211 and 212.

Figure 4:
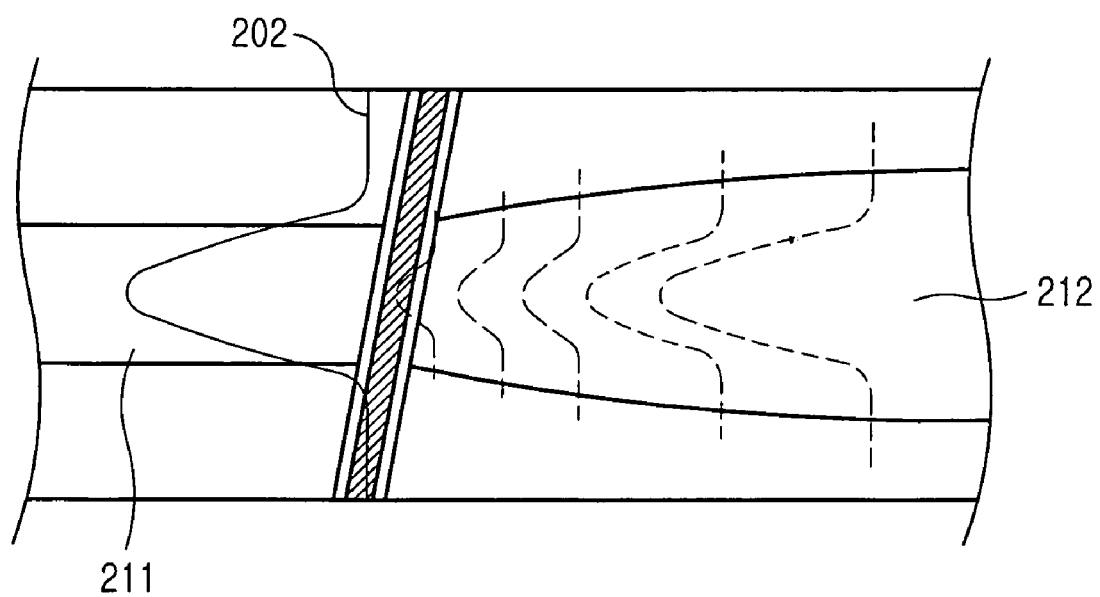
FIG. 4 is a view for showing the planar lightwave circuit shown in FIG. 2.

Referring to FIG. 4, the second waveguide 212 has a profile according to Equation 1 or Equation 2. The optical signals inputted through the first waveguide 211 are diffused while passing through the second waveguide 212. Therefore, the second waveguide compensates for the insertion loss generated in the trench.

Equation 1 (Parabolic Horn Structure)

$$W(t)=W_1+\sqrt{(\alpha t L_h)}, (0 \leq t \leq 1)$$

In Equation 1, W(t) is a function which represents the width change to the lengthwise direction parallel to the optical axis of the second waveguide 212, and $L_h$ represents the length of the second waveguide 212, and $W_1$ represents the width of one surface of the second waveguide 212 opposite to the first waveguide 211. Here, α is a shape-controlling parameter for the line width of the second waveguide 212.

Equation 2 (Polynimial Structure)

$$W(t)=W_1+a(tL)+b(tL)^2+c(tL)^3+\ldots+z(tL)^n$$

In Equation 2, W(t) is a function which represents width change to the lengthwise direction parallel to the optical axis of the second waveguide 212, $L_h$ represents the length of the second waveguide 212, and $W_1$ represents the width of one surface of the second waveguide 212 opposite to the first waveguide 211. W(t) is a polynimial function, and the second waveguide 212 has a structure in which the width thereof is gradually wider according to Equation 2.

Figure 5:
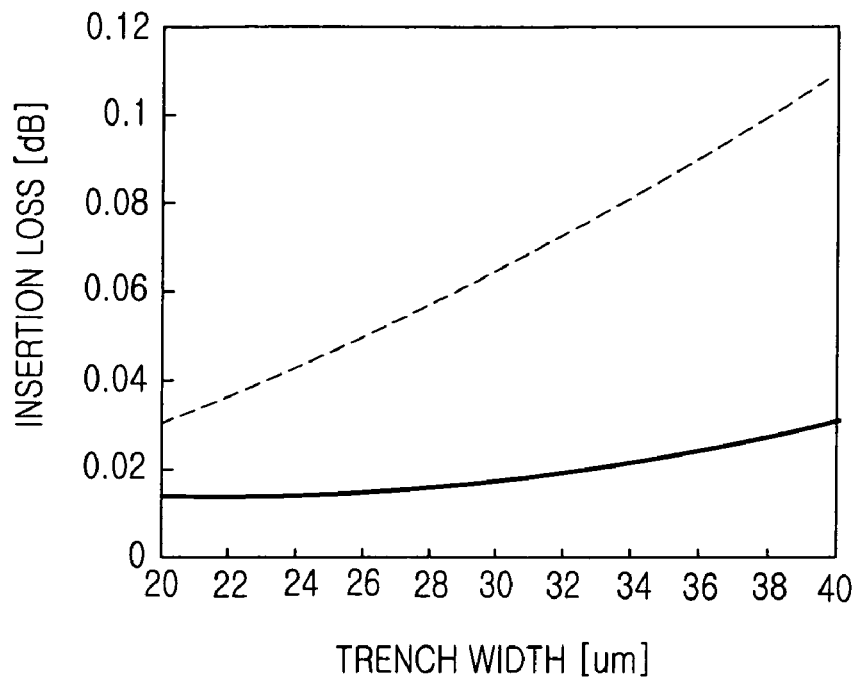
FIGS. 5 and 6 are graphs comparing optical signal coupling losses of the planar lightwave circuit according to the present invention with those of a conventional planar lightwave circuit.
Figure 6:
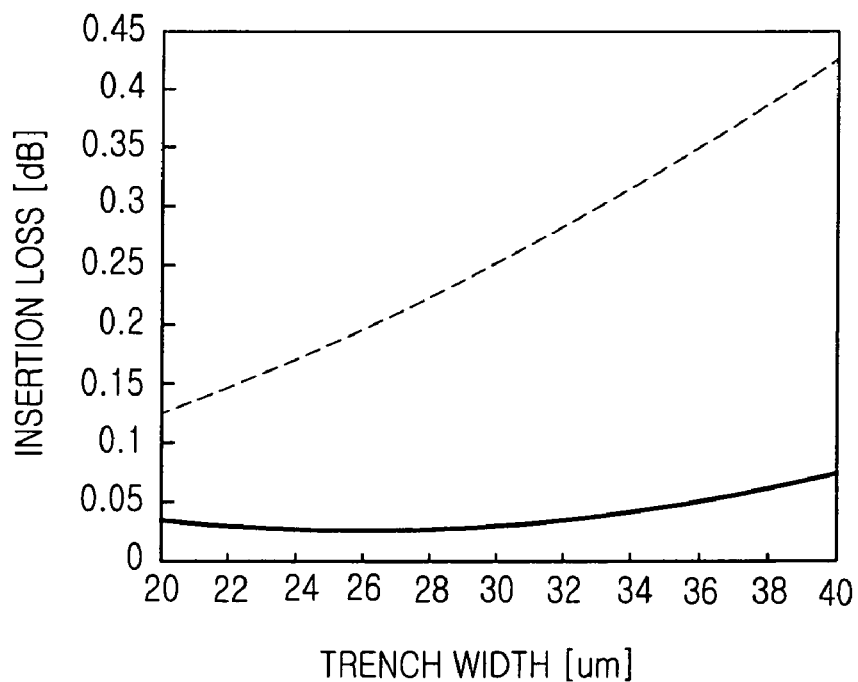

FIGS. 5 and 6 are graphs of a comparison of optical signal coupling losses between the planar lightwave circuit according to the present invention and a conventional planar lightwave circuit. More specifically, FIG. 5 compares the planar lightwave circuit according to the present invention with the conventional planar lightwave circuit in case a refractive index difference between the cores and the clads is 0.3%, and FIG. 6 compares the present invention and the prior art in case the refractive index difference is 0.75%. The trench widths of the planar lightwave circuit shown in FIGS. 5 and 6 can be variously applied with 20 to 40 μm.

Referring to FIG. 5, in the planar lightwave circuit according to the present invention, $W_1$ is 8 μm, α is 0.21, $L_h$ is 274 μm, and the profile is determined in Equation 1 and Equation 2.

The dotted line in the graph represents the insertion loss of a planar lightwave circuit which is not according to the teachings of the present invention. It shows the insertion loss between within 0.03 to 0.06 dB. In contrast, the solid line represents the insertion loss change of the planar lightwave circuit which includes the horn waveguide at the second waveguide according to the present invention, and the insertion loss change is between 0.01 to 0.02 dB which is a value less than 50% of the insertion loss of the dotted line.

Referring to FIG. 6, the graph shows the test result when $W_1$ is 4 μm, α is 0.78, L is 277.5 μm, and the profile is determined in Equation 1.

The dotted line represents the insertion loss of the planar lightwave circuit which has no horn structure as in the present invention. In the dotted line, the insertion loss is 0.1 dB in case the width of the trench is 20 μm, and the insertion loss is 0.25 dB in case the width of the trench is 40 μm. Note that the insertion loss I is increased by 25 times compared with that of the trench having a width of 20 μm in case that the width of the trench is 40 μm.

Meanwhile, the solid line represents the insertion loss of the planar lightwave circuit having a horn structure according to the teachings of the present invention. In the solid line, the insertion loss is within 0.02 to 0.03 dB and is decreased by under about ¹⁄₁₀ compared with the case in which the planar lightwave circuit having no horn structure.

Namely, as shown in FIGS. 5 and 6, the insertion losses of the planar lightwave circuit using the waveguide of horn structure is decreased in comparison with those of the conventional planar lightwave circuit. On the other hand, the insertion loss of the planar lightwave circuit including the waveguide of horn structure of FIG. 6 is 0.02 to 0.03 dB, and is similar to that of the planar lightwave circuit which has refractive index difference of 0.3% which is shown in FIG. 5.

Accordingly, the insertion loss of the planar lightwave circuit which comprises a waveguide of the profile according to the present invention is remarkably smaller than that of the conventional device. As the loss compensation of the planar lightwave circuit having a waveguide of high refractive index difference is large, the structure of the present invention can be applied to the planar lightwave circuit having refractive index difference larger than 0.3%.

Therefore, as the horn structure is applied to a waveguide having a large refractive index difference of 0.75%, the compensation of the insertion loss generated by a trench for mounting the optical filter is larger, thus the present invention can be applied to high density integration of the planar lightwave circuit and to an HIC (high index contrast) platform to which an optical filter is mounted.

Furthermore, while the insertion loss of the planar lightwave circuit which does not include a waveguide of the horn structure is largely changed according to the width of the trench, the insertion loss of the planar lightwave circuit which includes the waveguide of the horn structure is smoothly changed regardless of the width of the trench.

Namely, the planar lightwave circuit according to the present invention has a structure insensible to the width of the trench, and thus the width of the trench can be variously applied. Therefore, the planar lightwave circuit according to the present invention can use various types of optical filters.

Table 1 below is a table for comparing insertion losses of the planar lightwave circuit which can perform multiplexing/demultiplexing functions in which the light of some waves are reflected and the light of some waves are transmitted. The insertion losses of the planar light wave circuit which has refractive index difference of 0.75% and includes waveguides with the horn structure are compared with those of the planar light wave circuit which has no horn structure.

The planar lightwave circuit applied to Table 1 has an optical filter of multiplexing/demultiplexing type in which the light having a wave of 1310 nm can be transmitted and in which the light having a wave of 1550 nm can be reflected. The optical filter used in the experiment of Table 1 has a substrate whose thickness is 4 μm, and has a overall thickness of 22 μm including the thickness of a thin film.

|  | Conventional waveguide (refractive index difference of 0.75%) | Waveguide with horn structure (refractive index difference of 0.75%) |
|---|---|---|
| Transmission loss (T) | ~1.0 dB | <0.5 dB |
| Reflection loss (R) | ~1.2 dB | <0.8 dB |

In case the refractive index difference is 0.75% the transmission and reflection losses of the planar lightwave circuit of the horn structure are decreased by more than 50%, compared with the planar lightwave circuit which does not have the waveguide of horn structure. In addition, even when a plurality of optical filters are connected in type of cascade, the overall insertion loss can be restrained.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A planar lightwave circuit having an optical filter, comprising:
   a substrate;
   a first waveguide having a linear transmission waveguide and a reflection waveguide;
   a second waveguide coupling the first waveguide at a first cross-section at one end, in which the width of the first cross-section is narrower than a second cross-section at the other end;
   a trench located between the first and second waveguides, in which the optical filter is disposed, wherein the trench is inclined by a predetermined angle with respect to an optical axis; and
   a lower clad, a core, and an upper clad sequentially stacked on the substrate of the planar lightwave circuit.

2. A planar lightwave circuit having an optical filter, comprising:
   a first waveguide;
   a second waveguide coupling the first waveguide at a first cross-section at one end, in which the width of the first cross-section is narrower than a second cross-section at the other end; and
   a trench located between the first and second waveguides, in which the optical filter is disposed, wherein a profile of the second waveguide is a parabolic horn structure according to the following equation:

$$W(t)=W_1+\sqrt{\alpha tL}, (0 \leq t \leq 1),$$

wherein W(t) denotes a function representing a change of a width in a lengthwise direction parallel to an optical axis of the second waveguide, L denotes a length of the first waveguide, $W_1$ denotes a width of one surface of the second waveguide opposite to the first waveguide, and α denotes a constant for representing the line width of the second waveguide.

3. A planar lightwave circuit having an optical filter, comprising:
   a first waveguide;
   a second waveguide coupling the first waveguide at a first cross-section at one end, in which the width of the first cross-section is narrower than a second cross-section at the other end; and
   a trench located between the first and second waveguides, in which the optical filter is disposed, wherein the first waveguide comprises:
      a transmission waveguide having a linear shape; and
      a reflection waveguide is a parabolic horn structure according to the following equation:

$$W(t)=W_1+\sqrt{\alpha tL_h}, (0 \leq t \leq 1),$$

wherein W(t) denotes a function representing a change of a width in a lengthwise direction parallel to an optical axis of the second waveguide, $L_h$ denotes a length of the first waveguide, $W_1$ denotes a width of one surface of the second waveguide opposite to the first waveguide, and a denotes a constant for representing the line width of the second waveguide.

4. The planar lightwave circuit according to claim 3, wherein the transmission waveguide is a single mode waveguide.

5. A planar lightwave circuit having an optical filter, comprising:
   a first waveguide;
   a second waveguide coupling the first waveguide at a first cross-section at one end, in which the width of the first cross-section is narrower than a second cross-section at the other end; and
   a trench located between the first and second waveguides, in which the optical filter is disposed, wherein a profile of the second waveguide is polynomial structure according to the following equation:

$$W(t)=W_1+a(tL)+b(tL)^2+c(tL)^3+\ldots+z(tL)^n, (0 \leq t \leq 1),$$

wherein W(t) denotes a function representing a change of a width in a lengthwise direction parallel to an optical axis of the second waveguide, L denotes a length of the first waveguide, $W_1$ denotes a width of one surface of the second waveguide opposite to the first waveguide, and a to z denote arbitrary constants.

6. A method for producing a planar lightwave circuit having an optical filter, comprising the steps of:
   providing a first waveguide;
   providing a second waveguide having a width at one end narrower than the other end; and
   providing a trench between the first and second waveguides, in which the optical filter is disposed, wherein a profile of the second waveguide is a parabolic horn structure according to the following equation:

$$W(t)=W_1+\sqrt{\alpha tL_h}, (0 \leq t \leq 1),$$

wherein W(t) denotes a function representing a change of a width in a lengthwise direction parallel to an optical axis of the second waveguide, L denotes a length of the first waveguide, $W_1$ denotes a width of one surface of the second waveguide opposite to the first waveguide, and a denotes a constant for representing the line width of the second waveguide.

7. A method for producing a planar lightwave circuit having an optical filter, comprising the steps of:
   providing a first waveguide;
   providing a second waveguide having a width at one end narrower than the other end; and
   providing a trench between the first and second waveguides, in which the optical filter is disposed, wherein the first waveguide comprises:
      a transmission waveguide having a linear shape; and
      a reflection waveguide is a parabolic horn structure according to the following equation:

$$W(t)=W_1+\sqrt{\alpha tL}, (0 \leq t \leq 1),$$

wherein W(t) denotes a function representing a change of a width in a lengthwise direction parallel to an optical axis of the second waveguide, L denotes a length of the first waveguide, $W_1$ denotes a width of one surface of the second waveguide opposite to the first waveguide, and α denotes a constant shape-controlling parameter for the line width of the second waveguide.

8. The method according to claim 7, wherein the transmission waveguide is a single mode waveguide.

9. A method for producing a planar lightwave circuit having an optical filter, comprising the steps of:
providing a first waveguide;
providing a second waveguide having a width at one end narrower than the other end; and
providing a trench between the first and second waveguides, in which the optical filter is disposed, wherein a profile of the second waveguide is polynomial structure according to the following equation:

$$W(t)=W_1+a(tL)+b(tL)^2+c(tL)^3+ \ldots +z(tL)^n,$$
$$(0 \leq t \leq 1),$$

wherein W(t) denotes a function representing a change of width in a lengthwise direction parallel to an optical axis of the second waveguide, L denotes a length of the first waveguide, $W_1$ denotes a width of one surface of the second waveguide opposite to the first waveguide, and a to z denote arbitrary constants.

10. The planar lightwave circuit of claim 1, wherein the reflection waveguide is identical to the second waveguide.

11. The planar lightwave circuit of claim 1, wherein the linear transmission waveguide and the reflection waveguide are merged at one end of the trench.

12. The planar lightwave circuit of claim 1, wherein the transmission waveguide is a single mode waveguide.

* * * * *